United States Patent

[11] 3,552,257

[72] Inventor Atsushi Tanabe
No. 977 Nishikumado, Numazu, Shizuoka-ken, Japan
[21] Appl. No. 815,328
[22] Filed Apr. 11, 1969
Continuation-in-part of application Ser. No. 641,312, May 25, 1967, now abandoned.
[45] Patented Jan. 5, 1971
[32] Priority May 30, 1966
[33] Japan
[31] No. 41/50,765

[54] FASTENER ADAPTED FOR WIRE CAGE
7 Claims, 17 Drawing Figs.
[52] U.S. Cl. .................................................. 85/1, 85/32, 85/50; 339/272
[51] Int. Cl. ............................................... F16b 35/02
[50] Field of Search .......................................... 287/49; 24/125, 135; 339/272B

[56] References Cited
UNITED STATES PATENTS
834,669 10/1906 Fricke ........................ 339/272B
1,502,417 7/1924 Arnstein ........................ 24/135

Primary Examiner—Edward C. Allen
Attorney—Wenderoth, Lind & Ponack

ABSTRACT: In a nut and bolt fastener, an axially cut notch wide enough to accommodate a single wire therein of predetermined gauge, said notch extending from the end of an externally threaded bolt shank to the head thereof is made by cutting out the central longitudinal portion of the shank. The fastener can secure another wire or plate to be held to a support wire by inserting the support wire together with a second wire into the notch, or inserting the support wire only into the notch and passing the notched shank through an aperture of a plate, and screwing a wing nut towards them.

PATENTED JAN 5 1971

INVENTOR.
Atsushi Tanabe
BY
Wenderoth, Lind & Ponack
ATTORNEYS

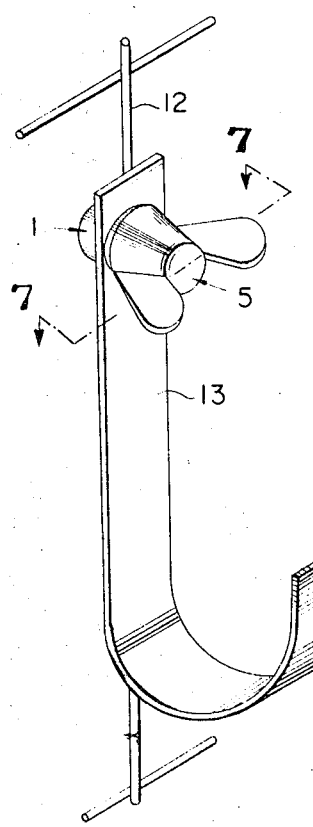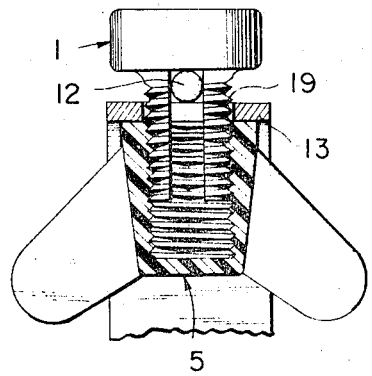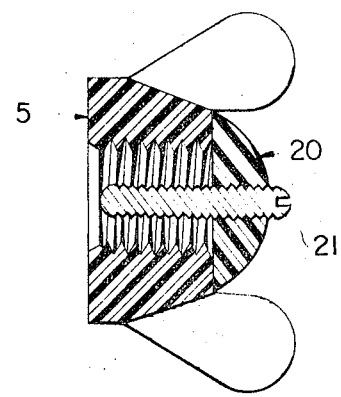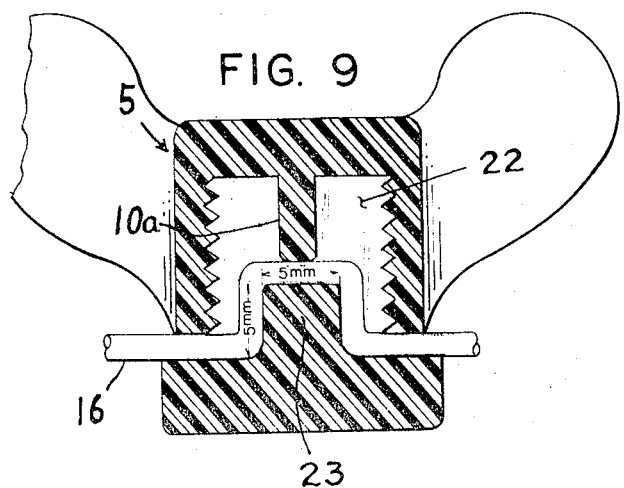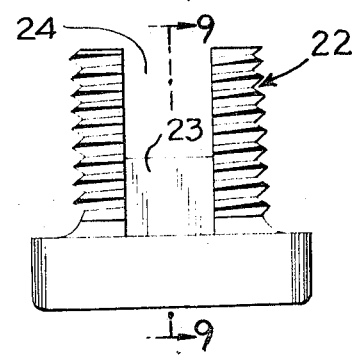

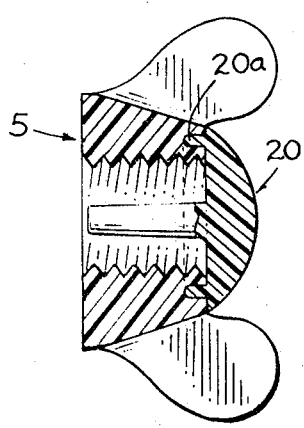
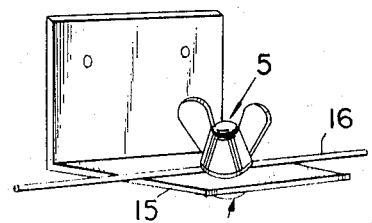
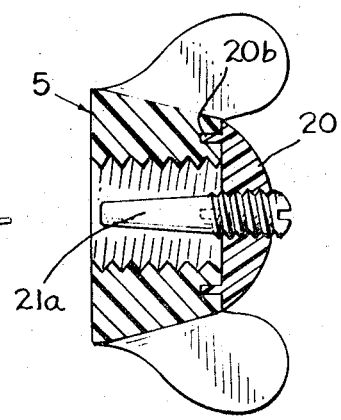
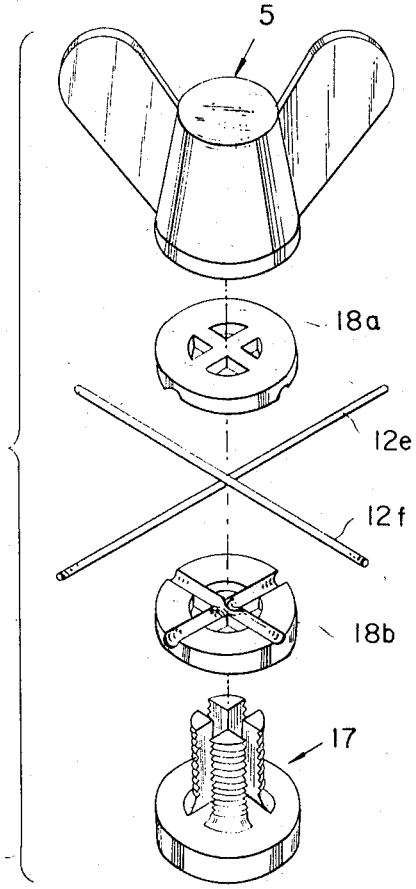
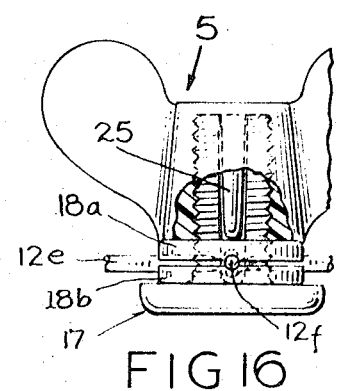

FASTENER ADAPTED FOR WIRE CAGE

This application is a continuation-in-part of my copending application Serial No. 641,312 filed May 25, 1967, now abandoned.

The present invention relates to a novel fastener of nut and bolt type, and more particularly, to a novel and improved fastener adapted for a wire cage.

The fastener of nut and bolt type of this invention has been invented and developed in order to adapt itself particularly to wire cage use in the field of poultry husbandry. However, the novel fastener of this invention is advantageous for use in every field of construction and assembly work, such as assembly of mechanical and electronic parts.

In general, the cage system for poultry production is widely employed because it has several advantages that the laying of eggs can be discerned at a glance, poultry raising can be effected in a three-dimensional manner just as the floor system. In addition, in a large-scale cage system for poultry production, a series of cages are continuously provided on a continuous rack construction, single row, split stairsteps, back to back or double deck, and besides, a watering trough together with a feed trough is installed in front of cages.

Recently, a vinyl trough has been introduced in the market in place of an expensive stainless or galvanized steel one with a plastic liner. The vinyl trough of one-piece construction without seams or joints, is easy to install, clean and maintain, and further with nothing to crack, break, and more importantly, nothing to rust or corrode. Thus, the problem of corrosive metallic troughs has been solved by the one of synthetic resin.

Next, a problem arose as how to affix the vinyl trough to a single wire of which each cage is assembled. This is solved by supporting the trough by a wire holder and hooking the upper end of the wire holder on the single wire of cage. However, while this method of hooking appears to be simple, as a matter of fact, it is rather difficult to install the water trough to the cage to provide it in a precise horizontal or slightly inclined position, so as to facilitate the flow of water in the trough. Further, it is necessary to adjust the level of the feed trough periodically during the growth of poultry.

As is well known, a steel wire which constitutes a preferred cage has a diameter of about 2.5 —3 mm. and is coated with a zinc coating. A relatively expensive stainless steel wire and an aluminum wire are also used. No matter what material the wire may be, the diameter thereof for use in cage making is in the range of 2.5 —3 mm. described above, hence it was inconvenient and impractical for the wire to serve as a stable support when considering the hanging a holder thereon to support a trough. A clip and the link now commonly employed have never been met with satisfaction as a fastening means which secures something to a single wire.

This invention proposes to overcome the above disadvantages and to provide a novel and improved fastening means adapted particularly for a single wire of cage, said fastener being fabricated by cutting out an axial notch wide enough to accommodate a single wire therein from the central portion of bolt shank and having preferably a wingnut to be engaged therewith.

While innumerable kinds of nut and bolt fasteners are available in the market, a nut and bolt fastener adapted for simple and easy fastening of a fine gauge wire of 2.5 —3 mm. in diameter has never been evolved up to the present invention.

Accordingly, it is an essential object of the invention to provide a novel fastener of nut and bolt type which is effective for supporting a single wire which constitutes a wire construction, such as wire cage.

It is another object of the invention to provide a novel fastener of nut and bolt type which is adapted to secure a holder for a water trough as well as a feed trough to a single wire of cage in a simple, safe, effective and convenient manner.

It is still another object of the invention to provide a fastener of nut and bolt type which is effective for a fastener for a continuous length of electric cord at a plurality of points so as to facilitate an electric wiring system.

It is an additional object of the invention to provide a novel fastener of nut and bolt type which can secure an adjustable plate and the like which can be elevated according to the growth of chicken to a wire of cage in front thereof in an easy and simple manner.

It is still an additional object of the invention to provide a convenient fastener which can connect two ends of poultry netting and the like.

Other objects and advantages of the invention will be apparent as it is better understood from the following description, which, taken in connection with the accompanying drawing, discloses some preferred embodiments thereof.

Referring to the drawing:

FIG. 6 is a perspective view in which a holder for supporting a water or feed trough in front of the cage is secured to a wire thereof by the fastener of this invention;

FIG. 7 is a sectional view of FIG. 6 taken along the line 7–7;

FIG. 8 is a sectional view of a modified wingnut made of synthetic resin different from the one of FIG 3 in that the central rod can be separated from the body of the wingnut with which it is associated;

FIG. 9 is a sectional view of a modified nut and bolt of synthetic resin in which a flexible synthetic resin covered electric cord is tightly secured to a plate at three points, the section of the bolt being shown along the line 9–9 of FIG. 10;

FIG. 10 is a side view of the bolt of FIG. 9 from which the nut and the cord are removed;

FIG. 11 is a perspective view showing an electrified cord being tightly secured on the plate by the fastener of FIGS. 9–10 of this invention;

FIG. 12 is an exploded perspective view showing how two crossed wires are retained between a pair of washers complementally cut out to receive the four-cut cruciform slotted fastener of FIG. 4;

FIGS. 14 and 15 are cross-sectional detail views similar to FIG. 8, but showing, respectively, different embodiments of the central rods of the wing part of the fastener combination;

FIG. 16 is a view partially in side elevation and partially in section and related to FIG. 12, but showing a modified form of the fastener nut as assembled with the washers to clamp a pair of crossed wires; and FIG. 17 is a detailed cross section taken substantially through the center of one of the modified washers of FIG. 16.

The fastener bolt of this invention may be made of two kinds of material, preferably metal or plastic, whereas the nut should be made of only plastic material, although it is understood that the bolt could be made of plastic and the nut of metal. In some instances, the fastener bolt of this invention can be made of ceramic material. Where use conditions are such that the metal tends to be corroded, the two (nut and bolt) should be made of dissimilar material.

In general, the diameter of wire which constitutes a cage is in the range of 2.5 —3 mm. and the weight of troughs for water and feed is relatively light, hence it has been found that the fastener made of plastic material can meet the requirement of strength for poultry cage, although some of the plastic fasteners hitherto considered were deemed to be inferior to metal in strength.

With the advance of manmade material, a polyacetal synthetic resin sold under the trade name "Delrin" or "Duracon" is now available and called as a high strength material comparable to metal. It has been found that the fastener of this invention made of the above polyacetal synthetic resin can meet the requirement comparable to metal.

No matter how strong the plastic material referred above may be, however, in order to maintain a safety measure I have invented a central rod to be attached within the plastic wingnut as described hereinafter.

As a metallic material adapted for the manufacture of the fastener of this invention, iron, steel, brass, copper, aluminum, zinc, antimony and alloy thereof and the like may be employed. Polyacetal synthetic resin, such as, Delrin or Duracon may be employed as a resin material for the manufacture of the fastener of this invention. Further, a ceramic material may be used, too. However, the above materials adapted for the fastener of this invention may be illustrative only, not limited.

The fastener bolt of this invention may be made of metal, but in general metal has the disadvantage of corroding, whereas the synthetic resin material advantageously will never corrode. Although the fastener may be made of the above high strength polyacetal resin, it should be noted that some safety measure should be taken in order to prevent it from breaking by chance because it is considered to be inferior to metal in strength.

Figure 2:
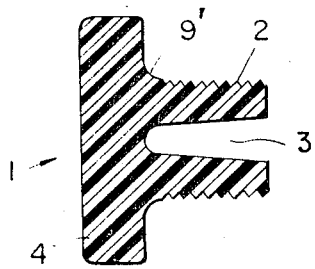
FIG. 2 is a longitudinal sectional view of a plastic bolt of this invention.
Figure 3:
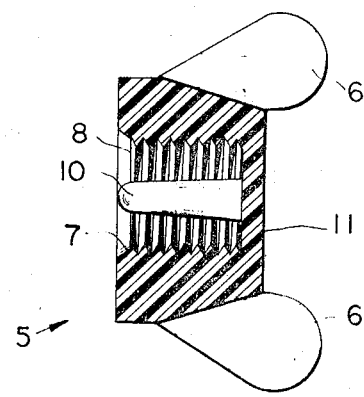
FIG. 3 is a longitudinal sectional view of a plastic wingnut engageable with the bolt of FIG. 3, showing a side view of a central, axially extended reenforcing rod.

To this end, the present invention provides the central rod 10 of FIG. 3 within a fastener nut or preferably a wingnut in the same FIG., this nut being made of synthetic resin. The provision of this central rod 10 within the plastic wingnut 5 in FIG. 3 is one of the important features of the fastener of this invention. By the aide of the central rod 10, the single slotted plastic bolt of FIG. 2 can be tightly engaged with the plastic wing nut 5 having the central rod 10 inserted centrally within the slotted portion of plastic bolt in a safe manner.

Figure 1:
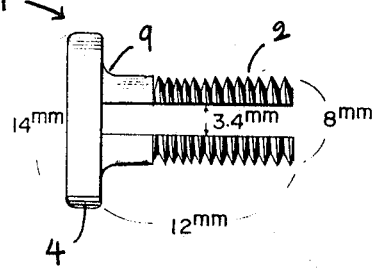
FIG. 1 is a side view of a metallic or other material bolt of this invention, showing some of its relative dimensions.

The bolt shank of this fastener is made with an axially cut notch 3 wide enough to accommodate a single wire therein extending from the end of an externally threaded shank to the head 4 thereof as clearly shown in FIGS. 1—2. If the bolt is made of plastic material as shown in FIG. 2, it may happen that the plastic bolt shank is distorted or broken when tightly engaged with the plastic wingnut or with the metallic wingnut.

In addition to the central rod 10, the plastic bolt and nut fastener are correspondingly made a little bigger than the metallic fastener.

The fastener of this invention comprises a known type single nut and bolt, but with the shank of the bolt being cut diametrically along the central axis thereof. The slot portion 3 is wide enough to accommodate a single wire therein. In reference to the metallic bolt, it is entirely of the same construction as the known one, except for an enlarged base portion 9, as shown in FIGS. 1—2. The shank of the bolt is externally threaded substantially the full length less an amount adjacent to the head equal to slightly less than the diameter of fine gauge wire to be used therewith, and having only a single axially extended medial slot of predetermined width to accommodate wire(s) of predetermined gauge. The slot terminates in a radius corresponding essentially to that of the fine gauge wire to be used therein, and the slot terminates at a depth coextensive with the full length of said shank, and preferably flush with the underside of the bolt head, thereby facilitating positive frictional gripping of the wire(s) between the enlarged undersurface of the bolt head and fastener nut clamping surface. The plastic wingnut is provided with the central rod therein. Therefore, the construction of the fastener of nut and bolt type of this invention is very simple and easily understandable. In more detail, it will be described hereinbelow.

FIG. 1 shows preferably a metallic bolt 1. It is understood that the length of shank and the number of threads 2 can be selected as desired. The axial deep notch 3 is made to be wide enough to accommodate the diameter of a wire, say, 2.5 —3 mm., which is illustrative only, not limited. The base portion 9 of the bolt shank is constructed as being internally curved so as to strengthen same because of the slotted shank. It is understood that the bigger the diameter of wire or rod, the wider the notch becomes. When a construction element, such as a big wire rope or a steel pipe, to be inserted into the notch of a bolt shank is employed, it is understood that a pretty large nut and bolt should be preferred.

FIG. 2 shows a plastic bolt of this invention which is different from the metallic bolt of FIG. 1 in that there is a convex portion 9' around the connection between head 4 and shank. This convex portion 9' is provided in the plastic bolt so as to make it strong. Additionally, the axial notch of plastic bolt flares a little toward the opening end. As is known, the flare notch has two advantages that it is easy to mold by injection molding and it is also convenient in actual use, preferably with a generally complementary formed axial projection on the nut.

FIG. 3 shows a plastic wingnut 5 of this invention wherein the nut is provided with a closed end cover to which a central rod 10 is integrally attached therein. The cover serves to support the central rod 10. The length of the central rod 10 is preferred to be shorter than the depth of the nut 5 and of a length to correspond with a predetermined gauge of wire to be clamped.

Figure 4:
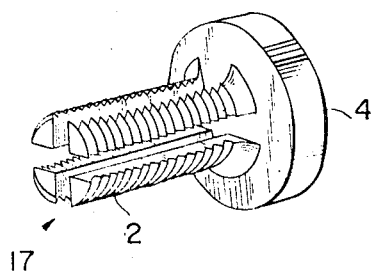
FIG. 4 is a perspective view of a modified bolt, the shank of which being cut into four portions by a cruciform slotway.
Figure 13:
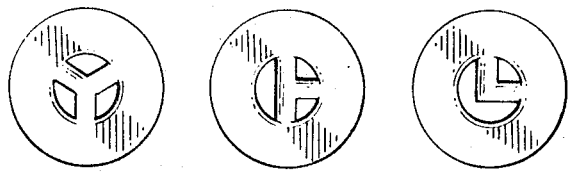
FIG. 13 is a composite end view of three similar or related fasteners representative of different forms of plural cuts or slots made in the shank of the fastener as in substantially Y, T and L shape.

FIG. 4 shows a modified bolt having the shank divided by intersecting slots dividing it into four equal portions, and is a modification of single cut, divided shank bolt of this invention. Based on the similar idea, a bolt with a three-cut portion and a bolt with an L-form cut portion may be invented, evolved and utilized, such as shown in FIG. 13. The use of the four-portion shank will be described hereinafter.

Figure 5:
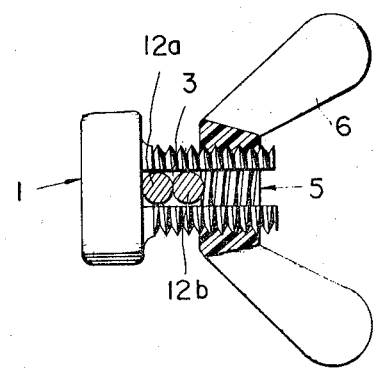
FIG. 5 shows a sectional view wherein two wires are clamped as by the bolt 1 of FIG. 1.

FIG. 5 shows a partial sectional view wherein two wires 12a and 12b are clamped by the bolt 1 such as of the type shown in FIG. 1 and an associated wingnut 5.

FIG. 6 shows how to secure a metallic holder 13 to a vertical wire 12 of cage by the fastener of this invention. An aperture 19 (see FIG. 7) is drilled through an upper portion of the holder 13, and the aperture 19 is large enough to pass the shank of bolt. The holder 13 has a curved portion at the lower end to receive a water or feed trough therein. This FIG. shows clearly that the fastener of this invention can be used to support an article easily and quickly from any part required for the poultry cage using a single wire as a support.

In this FIG. 6, the metallic holder 13 is shown as made of a narrow metal piece, but it can be made as of wire having a round eyelet or loop 19 made by bending it. When the aperture 19 is made in the form of a triangle or square it enables the holder 13 to maintain its position without shifting.

FIG. 6 shows the holder 13 in a vertical position, but the holder 13 or a narrow long piece of any material can be secured to a wire of cage in a horizontal position. The narrow long piece with no curved portion is called "adjustable piece." This piece has an aperture 19 as same as the holder 13. The narrow long piece can be secured to a wire in front of cage in a horizontal direction at any desired height or level. The adjustable narrow long plate is provided in front of cage, particularly, chick-breeder. The height or level of adjustable plate is controlled according to the growth of chick. The bigger the chick grows the higher the adjustable plate is positioned. By the aide of this adjustable plate positioned in front of cage, many chickens can drink water and feed side by side.

FIG. 8 shows a plastic wingnut similar to that of FIG. 4, but a central rod 21 is removably screwed through a cover 20 so that the rod 21 can be removed from the plastic wingnut body. This is a modified embodiment of plastic nut with a view to facilitating to adjust a space between a wire or cord and the top end of the rod 21. The cover 20 may be adhesively or otherwise affixed to the outer face of the nut 5, or it may be made removable as shown in FIGS. 14 and 15 by means of an annular lip 20a (FIG. 14) press fitted into a complemental recess in the outer end of the nut body 5; or by a plurality of pin members 20b (FIG. 15).

The central rod 21a in FIG. 15 is cylindrical or preferably tapered along the greater part of the shank for cooperation in the slotway(s), with only the outermost end being threaded as shown.

FIG. 9 is a modified form of the fastener of this invention in which the central rod 10 is relatively short, and a bolt 22 has a medial projection 23 within its slot 24. In FIG. 9, a section taken along the line 9-9 of FIG. 10, a flexible cord 16 is shown as it passes the top of the projection 23 and is tightly clamped at three points, viz., by the periphery of the nut 5 and a shortened central rod 10a.

FIG. 11 shows how a flexible electrified cord 16 is tightly affixed on the plate by the fastener of FIGS. 9—10.

FIG. 12 is an exploded perspective view in which two crossed wires or electric cords or the like 12e and 12f are fastened by the four-portioned, cross-slotted bolt in accordance with this invention between a pair of washers 18a and 18b.

The cruciform type slotway divides the shank into four equal portions, as shown, when axially centered. The washers are provided with recesses complementally formed to receive the four portions of the divided shank, and are further provided with cruciform recesses centered thereon and of a depth slightly less than the radius of the small gauge wire with which it is associated. 14

FIG. 16 partially shows the modified form of FIG. 12, wherein the nut 5 may also be provided with a more slender form of central axial projection 25 of the same type shown in FIGS. 3, 8, 14 or 15, and the washers are provided with additional central recessed areas as more clearly shown and described relative to FIG. 17 below.

While the four legs of the divided shank of the bolt will serve and be reenforced by the cooperation with and by the ribs 27 of the washers, the axial projection 25 is also desired in very small diameter screws where some of the four-way divided legs of the shank might otherwise tend to break off, if not centrally reenforced by the rod, responsive to tightening action of the nut 5.

FIG. 17 shows in cross section a modified detail wherein the central part is further recessed (as partially shown in washer 18b of FIG. 12) in either one or both directions to receive the hump where one of the wires crosses the other.

Accordingly, it is apparent that the foregoing description presents an improved fastener combination which achieves the objects and provides the various advantages set forth therein.

I claim:

1. A fastener assembly of the threaded bolt and nut type for clamping fine gauge wire characterized by and comprising in combination:
   a. a bolt with a head of substantially larger cross sectional area than that of the shank diameter, said bolt head having a substantially flat undersurface;
   b. the threaded shank of the bolt having an axially extended generally cruciform slotway formed by intersecting slots of substantially equal depth dividing the shank into a plurality of generally equal portions, and extending the full length of said shank and terminating flush with said undersurface of said bolt head, said slotway being of a width corresponding to the gauge of the wire with which it is to be associated;
   c. a pair of washers having apertures correspondingly centrally positioned to receive the plural portions of the shank as defined by said cruciform slotway, each of said washers further having a corresponding generally cruciform recess substantially centered thereon and said recesses being of a depth corresponding to slightly less than the radius of the gauge with which it is to be associated, said washers assembled with the cruciform recesses facing each other;
   d. said generally cruciform recesses of said washers include deeper recessed portions in the area of intersection of the recesses defining the cruciform shaped slotway to facilitate better clamping of overlapping intersecting wires being gripped by said fastener; and
   e. a fastening nut internally threaded to complementally cooperate with said threaded shank to clamp said washers together to grip together normally intersecting fine gauge wires therebetween.

2. A fastener assembly as defined in claim 1 wherein the nut is provided with a centrally disposed, axially extended generally cylindrical projection of a diameter slightly less than that of the gauge wire with which it is associated, and adapted to fit into the central recess of the cruciform slot way when the fastener is assembled to prevent collapse of the shank portions.

3. A fastener assembly as defined in claim 2 wherein the component parts are fabricated of plastic, and the axial projection provided on the nut is a separable part.

4. A fastener assembly as defined in claim 2 wherein the slot is provided with outwardly tapering sidewalls; and said generally cylindrical axial projection on said nut is complementally tapered for cooperation with said tapered slot.

5. A fastener assembly as defined in claim 2 wherein the axial projection and nut include complementally coacting means at the rearward or outermost part of the nut and projection respectively to provide axial adjustment of said axial projection.

6. A fastener assembly as defined in claim 2 wherein the nut and bolt component parts are fabricated of plastic and the said axial projection of the nut is fabricated in a separable part having an uninterrupted peripheral surface, and being insertable from and engageable only with the outermost end of the nut away from the head of the fastener bolt.

7. A fastener assembly as defined in claim 2 wherein the axial projection is at least partially threaded at its outermost end away from the bolt head and has no other interruptions or extensions apart from said threaded portion, and the nut associated therewith has a closed outermost end provided with a complementally threaded aperture to adjustably receive the threaded portion of the axial projection therein.